(12) United States Patent
Miyazoe et al.

(10) Patent No.: US 6,913,037 B2
(45) Date of Patent: Jul. 5, 2005

(54) MANIFOLD VALVE WITH SENSORS

(75) Inventors: Shinji Miyazoe, Tsukuba-gun (JP); Makoto Ishikawa, Tsukuba-gun (JP)

(73) Assignee: SMC Corporation, Tokyo (JP)

( * ) Notice: Subject to any disclaimer, the term of this patent is extended or adjusted under 35 U.S.C. 154(b) by 284 days.

(21) Appl. No.: 10/412,250

(22) Filed: Apr. 14, 2003

(65) Prior Publication Data

US 2004/0003850 A1 Jan. 8, 2004

(30) Foreign Application Priority Data

Jul. 5, 2002 (JP) ........................................ 2002-197655

(51) Int. Cl.⁷ ............................................. F16K 37/00
(52) U.S. Cl. .................. 137/557; 137/625.64; 137/884
(58) Field of Search ................................ 137/552, 554, 137/557, 625.64, 625.65, 884

(56) References Cited

U.S. PATENT DOCUMENTS

| | | | | |
|---|---|---|---|---|
| 4,150,686 A | * | 4/1979 | El Sherif et al. ............ | 137/557 |
| 4,687,021 A | * | 8/1987 | Ise et al. ..................... | 137/557 |
| 5,806,565 A | | 9/1998 | Kadlicko | |
| 5,819,783 A | * | 10/1998 | Blatt et al. ................... | 137/557 |
| 5,826,616 A | * | 10/1998 | Golden ........................ | 137/557 |
| 6,065,494 A | * | 5/2000 | Thomsen et al. ............ | 137/557 |
| 6,427,720 B1 | * | 8/2002 | Hayashi et al. .............. | 137/557 |
| 6,612,332 B2 | * | 9/2003 | Miyazoe et al. ............. | 137/557 |
| 6,675,830 B2 | * | 1/2004 | Doi et al. ..................... | 137/557 |
| 6,840,273 B2 | * | 1/2005 | Miyazoe et al. ............. | 137/884 |

OTHER PUBLICATIONS

U.S. Appl. No. 10/412,250, filed Apr. 14, 2003, Miyazoe et al.
U.S. Appl. No. 10/407,237, filed Apr. 7, 2003, Miyazoe et al.

* cited by examiner

*Primary Examiner*—John Rivell
(74) *Attorney, Agent, or Firm*—Oblon, Spivak, McClelland, Maier & Neustadt, P.C.

(57) ABSTRACT

In the manifold valve of the invention, a sensor chamber is formed in an upper face of a casing of a solenoid valve, pressure sensors are disposed in the sensor chamber, a wiring block including a wiring path in itself is connected to a portion of the casing, and signal conductors extending from the pressure sensors are introduced into a wiring path in the wiring block and are connected to a main wiring substrate through an intermediate block.

12 Claims, 3 Drawing Sheets

MANIFOLD VALVE WITH SENSORS

TECHNICAL FIELD TO WHICH THE INVENTION BELONGS

The present invention relates to a manifold valve with sensors, the valve detecting with sensors an operating state of a solenoid valve mounted onto a manifold base and more specifically to a manifold valve for detecting the operating state of the solenoid valve by detecting fluid pressure with pressure sensors.

PRIOR ART

In a manifold valve of this type formed by mounting a solenoid valve onto a manifold base, an operating state of a valve member such as a spool is normally detected with sensors in order to carry out monitoring of an operating condition of the solenoid valve, various control, or indications. As a detecting method in this case, there are a method in which a magnet mounted to the valve member is detected with magnetometric sensors, a method in which output fluid pressure is detected with pressure sensors and the like. According to the method in which the pressure sensors are used, a structure is simple because there is no need to mount the magnet to the valve member. However, because the pressure sensors have to be mounted at positions in the solenoid valve and close to output flow paths to face the output flow paths, the mounting positions are limited, which affects a wiring form of signal conductors for deriving detection signals from the sensors to make selection of wiring routes and a connecting operation burdensome.

Therefore, it is desired to make mounting of the pressure sensors and the wiring form of the signal conductors extending from the pressure sensors as simple as possible. It is also desirable to form the manifold valve such that operations such as detaching the pressure sensors from the solenoid valve and detaching the signal conductors from terminals for connection are not carried out where possible in separating the solenoid valve from the manifold base in maintenance and the like.

DISCLOSURE OF THE INVENTION

It is a technical object of the present invention to simplify mounting of pressure sensors to a solenoid valve and a wiring form of signal conductors between the pressure sensors and a manifold base in a manifold valve for detecting an operating state of the solenoid valve by detecting fluid pressure with the pressure sensors.

It is another technical object of the invention to obtain a manifold valve with sensors, the valve being easy to handle in maintenance.

To achieve the above objects, according to the invention, there is provided a manifold valve formed by mounting a solenoid valve directly or through an intermediate block onto a manifold base. The solenoid valve includes a casing having a plurality of valve ports and a valve hole with which the valve ports communicate, a spool housed for sliding in the valve hole to select a flow path, one or two solenoid-operated pilot valve(s) for driving the spool, a sensor chamber formed to be open to an outside in an upper face of the casing and covered with a detachable cover, one or more pressure sensors disposed in the sensor chamber to detect fluid pressure in the valve hole, and a wiring block connected to the casing to form a portion of the casing and having in itself a wiring path connecting the sensor chamber and the manifold base or the intermediate block, and a signal conductor from the pressure sensor(s) is introduced into the wiring path in the wiring block.

In the manifold valve of the invention having the above structure, the sensor chamber open to the outside is provided to the upper face of the casing of the solenoid valve and the pressure sensor(s) is (are) disposed in the sensor chamber. As a result, mounting of the pressure sensor(s) and replacement of them in the event of failure are easy. The wiring block is connected to the casing of the solenoid valve and the signal conductor from the pressure sensor(s) is lead to the intermediate block or the manifold base through the wiring path inside the wiring block. As a result, a wiring form of the signal conductor from the pressure sensor(s) is simplified to prevent improper wiring and to enhance maintainability.

According to a concrete structural form of the invention, a sensor substrate is disposed in the sensor chamber, the pressure sensor(s), an A/D converter for converting an analog detection signal from the pressure sensor(s) to a digital signal, and an indicating lamp for lighting up in response to the converted signal are mounted to the sensor substrate, and the signal conductor is detachably connected to the sensor substrate through a connector.

In the invention, a pressure detecting chamber communicating with the valve hole through a branch flow path is formed at a position in the casing far from the valve hole and close to the sensor chamber and a detecting portion of the pressure sensor(s) is disposed in the pressure detecting chamber.

According to a concrete structural form of the invention, the solenoid valve is directly mounted onto the manifold base, a first signal relay connector to which the signal conductor from the pressure sensor(s) is connected and a first feeding connector to be brought into continuity with the pilot valve(s) are separately provided at different positions in the solenoid valve. A main wiring substrate on which an electronic component for signal processing and a main connector for feeding and signal transmission are mounted is provided in the manifold base and a second signal relay connector which can be connected to the first signal relay connector and a second feeding connector which can be connected to the first feeding connector are respectively and electrically connected to the main wiring substrate and are separately provided at different positions.

According to another concrete structural form of the invention, the solenoid valve is mounted onto the manifold base through an intermediate block and the solenoid valve has a first feeding connector to be brought into continuity with the pilot valve(s). The intermediate block includes a plurality of connecting holes for respectively connecting the valve ports in the solenoid valve and base ports in the manifold base, a wiring hole which crosses the connecting holes without communicating with the connecting holes to communicate with the wiring path in the wiring block and through which the signal conductor communicating with the pressure sensor(s) is inserted, a main wiring substrate mounted with an electronic component for signal processing, a second feeding connector which can be connected to the first feeding connector, and a first relay connector for electrically connecting the intermediate block to the manifold base, and the signal conductor, the second feeding connector, and the first relay connector are respectively and electrically connected to the main wiring substrate. Furthermore, the manifold base includes a second relay connector which can be connected to the first relay connector and a main connector for electrically connecting the adjacent manifold bases and the main connector and the second relay connector are electrically connected to each other.

DETAILED DESCRIPTION

Figure 1:
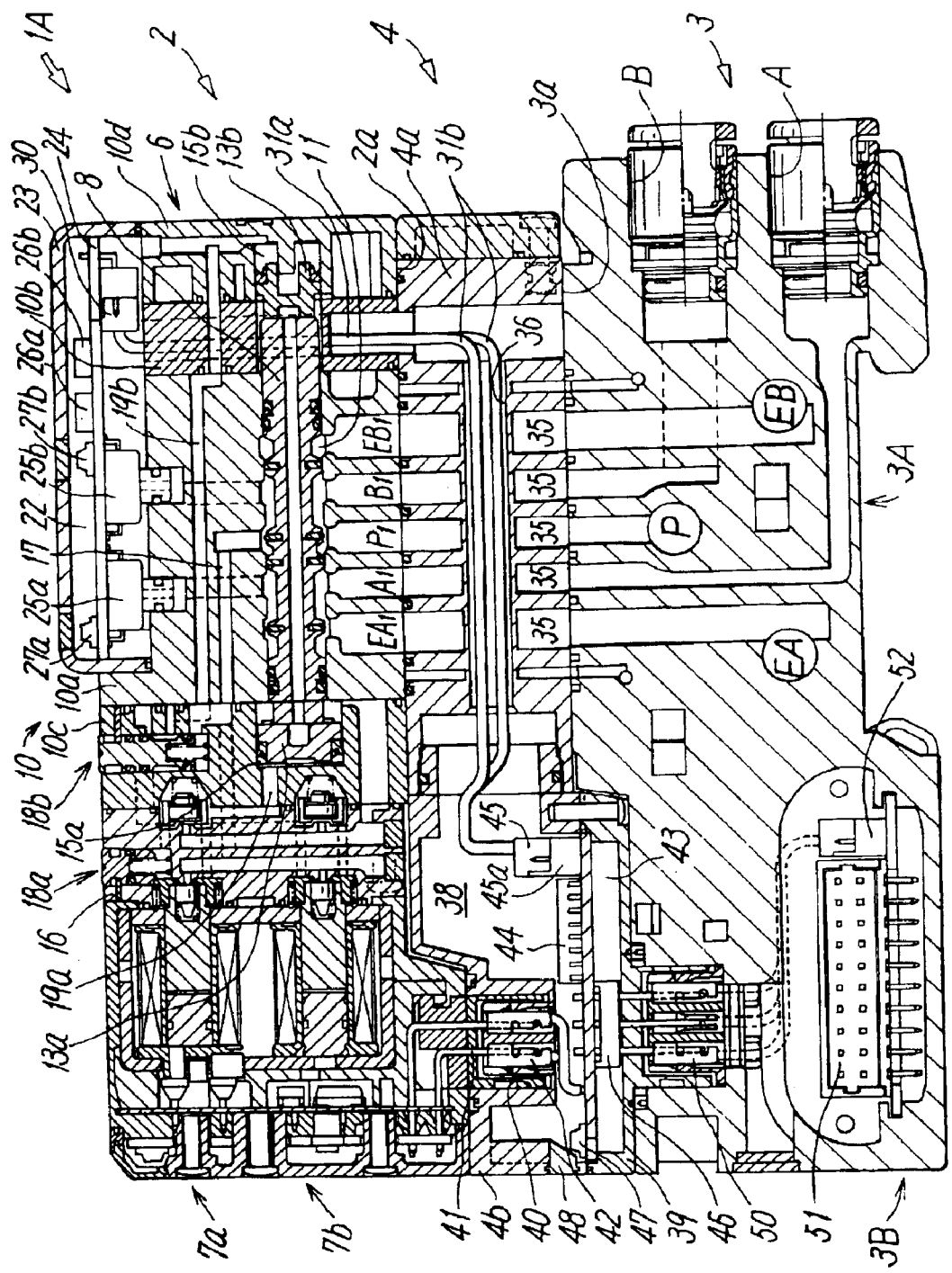
FIG. 1 is a sectional view of a first embodiment of a manifold valve according to the present invention.

FIG. 1 shows a first embodiment of a manifold valve according to the present invention. The manifold valve 1A is formed by mounting a solenoid valve 2 onto a manifold base 3 through an intermediate block 4.

The solenoid valve 2 is a pilot-type solenoid valve and includes a main valve portion 6 having a five-port valve structure and solenoid-operated pilot valves 7a and 7b connected to the main valve portion 6 to switch a spool 8 mounted in the main valve portion 6 with the pilot valves 7a and 7b. Therefore, the pilot valves 7a, 7b form a driving mechanism for driving the spool 8.

Figure 2:
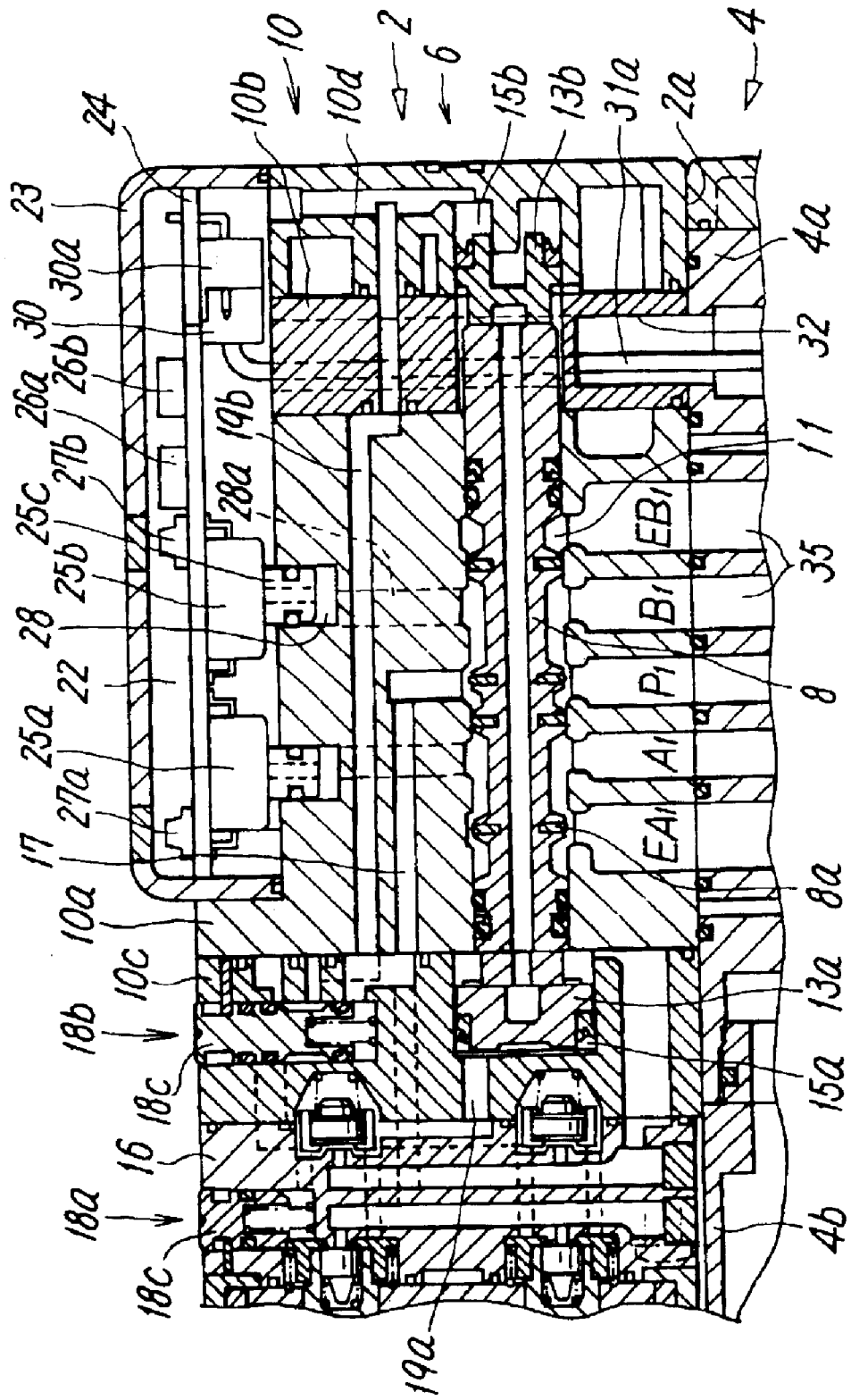
FIG. 2 is an enlarged view of an essential portion of FIG. 1.

The main valve portion 6 includes a casing 10 formed of non-magnetic material as can be seen from FIG. 2. The casing 10 is formed of a main block 10a having a rectangular section, a wiring block 10b connected to an end of the main block 10a, and a first end block 10c and a second end block 10d respectively joined to end faces of the wiring block 10b and the main block 10a. A lower face of the solenoid valve 2, especially a lower face of the casing 10, is formed as a mounting face 2a to be joined to an upper face of the intermediate block 4 through a gasket.

A portion of the mounting face 2a corresponding to a bottom face of the main block 10a is provided with a supply valve port $P_1$, two output valve ports $A_1$ and $B_1$ positioned on opposite sides of the supply valve port $P_1$, and two discharge valve ports $EA_1$ and $EB_1$ positioned on opposite sides of the output valve ports $A_1$ and $B_1$. Inside the main block 10a and wiring block 10b, a valve hole 11 with which the above respective valve ports communicate in the above-described arrangement is formed. In the valve hole 11, the spool 8 for selecting the flow path is housed for sliding. At an outer periphery of the spool 8, a plurality of sealing members 8a for selecting the flow path between the respective ports are provided.

In the first end block 10c and the second end block 10d, piston chambers are formed respectively at positions where opposite ends of the spool 8 face. Pistons 13a and 13b are respectively housed for sliding in the opposite piston chambers. The piston chamber formed in the first end block 10c has a large diameter and houses in itself the large-diameter first piston 13a which is in contact with one end of the spool 8. The piston chamber formed in the second end block 10d has a small diameter and houses in itself the small-diameter second piston 13b which is in direct contact with the other end of the spool 8.

First and second pressure chambers 15a and 15b are formed respectively on back face sides of the respective pistons 13a and 13b. The first pressure chamber 15a positioned on the back face side of the large-diameter first piston 13a communicates with the supply valve port $P_1$ through a pilot supply flow path 17, a manual operation mechanism 18a provided to a pilot block 16, the pilot valve 7a, and a pilot output flow path 19a. The second pressure chamber 15b positioned on the back face side of the small-diameter second piston 13b communicates with the supply valve port $P_1$ through the pilot supply flow path 17, the other pilot valve 7b, a manual operation mechanism 18b, and a pilot output flow path 19b.

When the one pilot valve 7a is turned off, the first pressure chamber 15a opens into the atmosphere, the other pilot valve 7b is turned on, and pilot fluid from the pilot supply flow path 17 is supplied to the second pressure chamber 15b through the pilot output flow path 19b, the spool 8 is pushed by the second piston 13b to occupy a first selecting position where the spool 8 has moved leftward as shown in FIG. 1. If a switch between the pilot valves 7a and 7b is carried out from this state such that the pilot valve 7a is turned on and that the pilot valve 7b is turned off, the second pressure chamber 15b opens into the atmosphere and the pilot fluid is supplied to the first pressure chamber 15a. Therefore, the spool 8 is pushed by the piston 13a, moved rightward, and switched to a second selecting position.

The manual operation mechanisms 18a and 18b are respectively for manually obtaining selecting states similar to the cases in which the pilot valves 7a and 7b are turned on and used during a power failure or when the pilot valves 7a and 7b are out of order. In other words, the manual operation mechanism 18a corresponds to the pilot valve 7a. By pushing down an operation member 18c, the pilot supply flow path 17 and the pilot output flow path 19a directly communicate with each other and pilot fluid is supplied to the first pressure chamber 15a from the supply valve port $P_1$. The other manual operation mechanism 18b corresponds to the pilot valve 7b. By pushing down an operation member 18c, the pilot supply flow path 17 and the pilot output flow path 19b directly communicate with each other and the pilot fluid is supplied to the second pressure chamber 15b from the supply valve port $P_1$.

The pilot valves 7a and 7b are for opening and closing the pilot flow paths by energization of a solenoid. Because structures and operations of the pilot valves 7a and 7b are similar to those of known pilot valves, concrete descriptions of them will be omitted.

On an upper face of the casing 10 in the solenoid valve 2, a sensor chamber 22 covered with a detachable cover 23 is formed at a position astride the main block 10a, the wiring block 10b, and the second end block 10d. The sensor chamber 22 is formed of a relatively shallow recessed step portion formed in the upper face of the casing 10. In the sensor chamber 22, a sensor substrate 24 provided with printed wiring is disposed. The sensor substrate 24 is mounted with two pressure sensors 25a and 25b, A/D converters 26a and 26b for converting analog detection signals from the pressure sensors 25a and 25b to digital signals, and indicating lamps 27a and 27b for lighting up in response to the converted signals. The A/D converters 26a and 26b and the indicating lamps 27a and 27b are respectively disposed to correspond to the respective pressure sensors 25a and 25b. At positions of the cover 23 corresponding to the indicating lamps 27a and 27b, transparent portions for observation are formed respectively.

The pressure sensors 25a and 25b respectively detect output fluid pressure in the two output valve ports $A_1$ and $B_1$. Detecting portions 25c of the pressure sensors 25a and 25b are respectively housed in pressure detecting chambers 28 communicating with the output valve ports $A_1$ and $B_1$. The pressure detecting chambers 28 are formed at positions far from the valve hole 11 but close to the sensor chamber 22 and are connected by branch flow paths 28a to positions of the valve hole 11 where the output valve ports $A_1$ and $B_1$ are open. By providing the pressure detecting chambers 28 at such positions that the detecting portions 25c of the pressure sensors 25a and 25b face the pressure detecting chambers 28, there is no need to sink the whole sensor chamber 22 close to the valve hole 11 as compared with a case in which the detecting portions 25c directly face the valve hole 11. Therefore, there is an advantage in that the sensor chamber 22 can be prevented from conflicting with the pilot supply flow path 17 and the pilot output flow path 19b in terms of positions to thereby easily form the sensor chamber 22 and dispose the pressure sensors 25a and 25b.

When the spool 8 is at a first selecting position on a left side shown in FIG. 1, the second output valve port $B_1$ communicates with the supply valve port $P_1$ and fluid pressure increases. Therefore, the second pressure sensor 25b operates to output the detection signal. When the spool 8 has moved to a second selecting position on a right side, the first output valve port $A_1$ communicates with the supply valve port $P_1$ and fluid pressure increases. Therefore, the first pressure sensor 25a operates to output the detection signal.

On the sensor substrate 24, a conductor connector 30 is detachably connected to a connecting portion 30a in continuity with the pressure sensors 25a and 25b. Signal conductors 31a connected to the connector 30 are introduced into the intermediate block 4 through a wiring path 32 in the wiring block 10b. The wiring block 10b is provided for inserting the signal conductor 31a from the pressure sensors 25a and 25b through the wiring block 10b. Inside the wiring block 10b, the wiring path 32 is formed so as not to cross the valve hole 11 and the pilot output flow path 19b.

The intermediate block 4 has substantially the same length and lateral width as the manifold base 3 and the solenoid valve 2, is formed of a first block body 4a on a half side in the longitudinal direction and a second block body 4b on the other half side, and has an upper face joined to the solenoid valve 2 and a lower face joined to the manifold base 3.

Inside the first block body 4a corresponding to the main valve portion 6 of the solenoid valve 2, a plurality of connecting holes 35 for connecting the respective valve ports $P_1$, $A_1$, $B_1$, $EA_1$, and $EB_1$ in the solenoid valve 2 and respective base ports P, A, B, EA, and EB in the manifold base 3 and a wiring hole 36 passing through a central portion of the first block body 4a in an axial direction without communicating with the connecting holes 35 to communicate with the wiring path 32 of the wiring block 10b are provided. Through the wiring hole 36, signal conductors 31b extending from the signal conductors 31a are inserted. Although portions of the signal conductors 31b extending in the first block body 4a and portions of the signal conductors 31a extending in the wiring block 10b form seamless conductors in the example shown in the drawings, they may be separated from each other to be detachably connected to each other through connectors.

In the second block body 4b corresponding to the pilot valves 7a and 7b, a part housing chamber 38 formed to be open toward a lower face side of the second block body 4b and covered with a cover 39 and a connector housing chamber 40 open toward an upper face side are formed. In the connector housing chamber 40, a second feeding connector 42 is disposed. If the solenoid valve 2 is mounted onto the intermediate block 4, the second feeding connector 42 is electrically connected to a first feeding connector 41 on a lower face of the solenoid valve 2. In the part housing chamber 38, a main wiring substrate 43 provided with printed wiring is housed. On the main wiring substrate 43, an electronic component 44 such as a semiconductor device for performing signal processing such as conversion of a control signal for the solenoid valve 2 and sent from the controller from a parallel signal to a serial signal, a connecting portion 45a to which a conductor connector 45 mounted to tip ends of the signal conductors 31b is connected, a first relay connector 46 having a terminal projecting from the cover 39, and an indicating lamp 47 formed of a light-emitting diode 47 are mounted. Furthermore, the second feeding connector 42 is electrically connected to the main wiring substrate 43 through a lead wire.

The indicating lamp 47 lights up when the solenoid valve 2 operates abnormally. The detection signals from the pressure sensors 25a and 25b and control signals of the pilot valves 7a and 7b are processed in the electronic component 44 to judge an operating condition of the solenoid valve 2 and the indicating lamp 47 lights up based on the judgment. The indicating lamp 47 can be observed through a transparent portion 48 provided to the intermediate block 4.

The manifold base 3 is of a stacking type used by joining a plurality of manifold bases together in a thickness direction and is formed such that one selector valve 2 can be mounted to the manifold base 3 through the intermediate block 4. A half of the manifold base 3 in the longitudinal direction is formed into a flow path forming portion 3A and the other half is formed into an electric connection portion 3B. On an upper face of the manifold base 3, the placing face 3a is formed astride the flow path forming portion 3A and the electric connection portion 3B. The flow path forming portion 3A and the electric connection portion 3B may be formed integrally or may be formed separately and connected to each other.

In the flow path forming portion 3A, the supply base port P and discharge base ports EA and EB passing through the manifold base 3 in the thickness direction are formed and two output base ports A and B which open in an end face of the manifold base 3 are formed. The base ports P, EA, EB, A, and B respectively open on the placing face 3a and respectively communicate with the respective valve ports $P_1$, $EA_1$, $EB_1$, $A_1$, and $B_1$ in the solenoid valve 2 through the respective connecting holes 35 in the intermediate block 4 when the solenoid valve 2 is mounted onto the placing face through the intermediate block 4.

In the electric connection portion 3B, a second relay connector 50 and a main connector 51 are provided and are electrically connected to each other through an auxiliary connector 52. The second relay connector 50 is electrically connected to the first relay connector 46 to pass on supply of driving power to the solenoid valve 2 when the intermediate block 4 is mounted onto the manifold base 3. The main connector 51 is for transmitting a control signal for the solenoid valve, supplying driving power, or transmitting the detection signals from the pressure sensors 25a and 25b between the adjacent manifold bases 3, 3. When the manifold bases 3, 3 are joined to each other, female and male connecting terminals of the main connectors 51, 51 are connected to each other.

In the manifold valve 1A of the first embodiment having the above structure, the sensor chamber 22 open to the outside is provided to the upper face of the casing 10 of the solenoid valve 2 and the pressure sensors 25a and 25b are disposed in the sensor chamber 22. As a result, mounting of the pressure sensors 25a and 25b and replacement of them in the event of failure are easy. The wiring block 10b is connected to the casing 10 of the solenoid valve 2 and the signal conductors 31a from the pressure sensors 25a and 25b are lead to the intermediate block 4 through the wiring path 32 inside the wiring block 10b. As a result, a wiring form of the signal conductors 31a from the pressure sensors 25a and 25b is simplified to prevent improper wiring and to enhance maintainability. Furthermore, electric connections between the solenoid valve 2 and the intermediate block 4 and between the intermediate block 4 and the manifold base 3 are respectively established through the connectors 41, 42 and 46, 50. As a result, an assembly operation and a disassembly operation in maintenance of the manifold valve 1A are facilitated.

Figure 3:
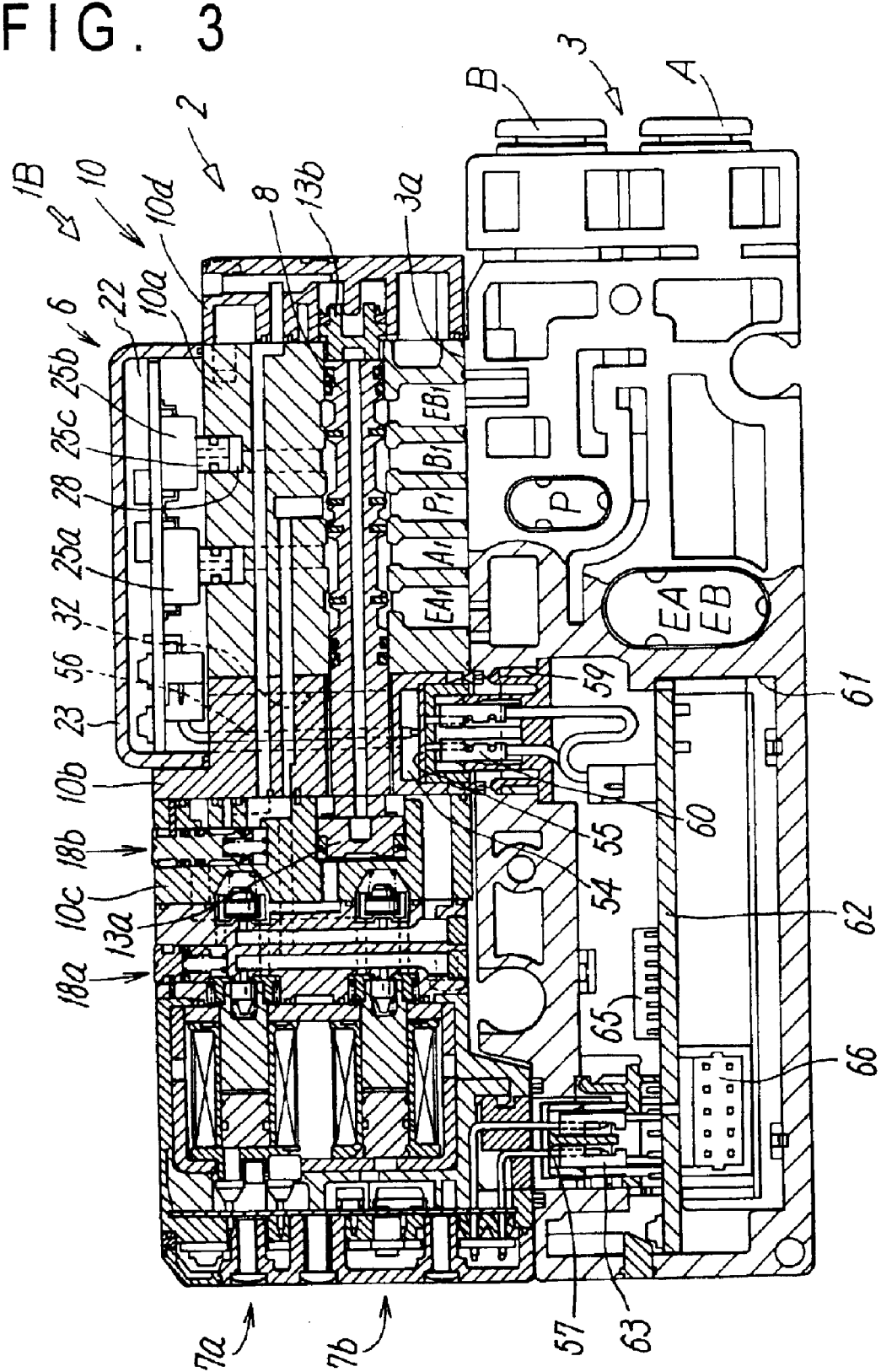
FIG. 3 is a sectional view of a second embodiment of the manifold valve according to the invention.

FIG. 3 shows a second embodiment of the invention. The manifold valve 1B of the second embodiment is different from the manifold valve 1A of the first embodiment in that the solenoid valve 2 is mounted not through the intermediate block 4 but directly onto the manifold base 3 and in the following structure related to it.

In the solenoid valve 2 of the second embodiment, the wiring block 10b of the casing 10 is disposed between the main block 10a and the first end block 10c. A first recessed portion 54 is formed at a position of a lower face of the wiring block 10b. In the recessed portion 54, a first signal relay connector 55 is disposed. To the first signal relay connector 55, signal conductors 56 from the pressure sensors 25a and 25b are connected. At a position corresponding to the pilot valves 7a and 7b, a first feeding connector 57 different from the first signal relay connector 55 is provided.

On the other hand, in the manifold base 3, a second recessed portion 59 is formed at a position on the placing face 3a corresponding to the first recessed portion 54 in the solenoid valve 2. In the second recessed portion 59, a second signal relay connector 60 is disposed. In a substrate housing chamber 61 in the base, a main wiring substrate 62 is disposed. At a position in the substrate housing chamber 61 corresponding to the first feeding connector 57, a second feeding connector 63 is disposed. The second signal relay connector 60 and the second feeding connector 63 are respectively and electrically connected to the main wiring substrate 62 and are respectively connected to the first signal relay connector 55 and the first feeding connector 57 when the solenoid valve 2 is mounted onto the manifold base 3. On the main wiring substrate 62, an electronic component 65 for signal processing and a main connector 66 for feeding and transmitting electric signals are mounted.

Because structures of the manifold valve 1B of the second embodiment other than those described above are substantially similar to those of the manifold valve 1A of the first embodiment, main similar components are provided with reference numerals similar to those of the first embodiment to omit descriptions of the components.

Although the two pilot valves 7a and 7b are provided to one side of the main valve portion 6, i.e., on a side of the first end block 10c in a concentrated manner in the above embodiments, the pilot valves 7a and 7b may be respectively provided to the side of the first end block 10c and the side of the second end block 10d. In the case of the double-pilot-type solenoid valve including the two pilot valves 7a and 7b as described above, diameters of the two pistons 13a and 13b are not necessarily different from each other, i.e., large and small but the pistons of the same diameters may be used.

It is also possible that the solenoid valve 2 is a single-pilot-type solenoid valve for switching the spool 8 with one pilot valve 7a. In this case, the pilot valve 7b corresponding to the small-diameter second piston 13b is omitted, the second pressure chamber 15b communicates with the supply port $P_1$ through the pilot output flow path 19b, the manual operation mechanism 18b, and the pilot supply flow path 17 such that the pilot fluid is supplied constantly. If the one pilot valve 7b is omitted in FIGS. 1 and 3, a dummy body substantially in the same shape and of the same dimensions as the omitted pilot valve 7b can be mounted to the position to thereby form the solenoid valve 2 in the same outside shape as the double-pilot-type solenoid valve.

Although the fluid pressures of the two output valve ports $A_1$ and $B_1$ are detected with the two pressure sensors 25a and 25b because the above embodiments are of the five-port type, the number of ports may be other numbers, e.g., three. In this case, one pressure sensor is used if there is one output valve port.

Moreover, it is also possible to detect fluid pressure of the supply valve port with the pressure sensor instead of detecting the fluid pressures of the output valve ports or in addition to detecting the fluid pressures of the output valve ports as described above.

According to the invention, the sensor chamber open to the outside is provided to the upper face of the casing of the solenoid valve and the pressure sensors are disposed in the sensor chamber. As a result, mounting of the pressure sensors and replacement of them in the event of failure are easy. The wiring block is connected to the casing of the solenoid valve and the signal conductors from the pressure sensors are lead to the intermediate block or the manifold base through the wiring path inside the wiring block. As a result, a wiring form of the signal conductors from the pressure sensors is simplified to prevent improper wiring and to enhance maintainability.

What is claimed is:

1. A manifold valve with a sensor, the manifold valve being formed by mounting a solenoid valve directly or through an intermediate block onto a manifold base, wherein
the solenoid valve includes a casing having a plurality of valve ports and a valve hole with which the valve ports communicate, a spool housed for sliding in the valve hole to select a flow path, one or two solenoid-operated pilot valve(s) for driving the spool, a sensor chamber formed to be open to an outside in an upper face of the casing and covered with a detachable cover, one or more pressure sensors disposed in the sensor chamber to detect fluid pressure in the valve hole, and a wiring block connected to the casing to form a portion of the casing and having in itself a wiring path connecting the sensor chamber and the manifold base or the intermediate block, and a signal conductor from the pressure sensor(s) is introduced into the wiring path in the wiring block.

2. A manifold valve according to claim 1, wherein a sensor substrate is disposed in the sensor chamber, the pressure sensor(s), an A/D converter for converting an analog detection signal from the pressure sensor(s) to a digital signal, and an indicating lamp for lighting up in response to the converted signal are mounted to the sensor substrate, and the signal conductor is detachably connected to the sensor substrate through a connector.

3. A manifold valve according to claim 1, wherein a pressure detecting chamber communicating with the valve hole through a branch flow path is formed at a position in the casing far from the valve hole and close to the sensor chamber and a detecting portion of the pressure sensor(s) is disposed in the pressure detecting chamber.

4. A manifold valve according to claim 2, wherein a pressure detecting chamber communicating with the valve hole through a branch flow path is formed at a position in the casing far from the valve hole and close to the sensor chamber and a detecting portion of the pressure sensor(s) is disposed in the pressure detecting chamber.

5. A manifold valve according to claim 1,
wherein the solenoid valve is directly mounted onto the manifold base,
a first signal relay connector to which the signal conductor from the pressure sensor(s) is connected and a first feeding connector to be brought into continuity with the pilot valve(s) are separately provided at different positions in the solenoid valve,
a main wiring substrate on which an electronic component for signal processing and a main connector for feeding and signal transmission are mounted is provided in the manifold base, and
a second signal relay connector which can be connected to the first signal relay connector and a second feeding connector which can be connected to the first feeding connector are respectively and electrically connected to the main wiring substrate and are separately provided at different positions.

6. A manifold valve according to claim 2,
wherein the solenoid valve is directly mounted onto the manifold base,
a first signal relay connector to which the signal conductor from the pressure sensor(s) is connected and a first feeding connector to be brought into continuity with the pilot valve(s) are separately provided at different positions in the solenoid valve,
a main wiring substrate on which an electronic component for signal processing and a main connector for feeding and signal transmission are mounted is provided in the manifold base, and
a second signal relay connector which can be connected to the first signal relay connector and a second feeding connector which can be connected to the first feeding connector are respectively and electrically connected to the main wiring substrate and are separately provided at different positions.

7. A manifold valve according to claim 3,
wherein the solenoid valve is directly mounted onto the manifold base,
a first signal relay connector to which the signal conductor from the pressure sensor(s) is connected and a first feeding connector to be brought into continuity with the pilot valve(s) are separately provided at different positions in the solenoid valve,
a main wiring substrate on which an electronic component for signal processing and a main connector for feeding and signal transmission are mounted is provided in the manifold base, and
a second signal relay connector which can be connected to the first signal relay connector and a second feeding connector which can be connected to the first feeding connector are respectively and electrically connected to the main wiring substrate and are separately provided at different positions.

8. A manifold valve according to claim 4,
wherein the solenoid valve is directly mounted onto the manifold base,
a first signal relay connector to which the signal conductor from the pressure sensor(s) is connected and a first feeding connector to be brought into continuity with the pilot valve(s) are separately provided at different positions in the solenoid valve,
a main wiring substrate on which an electronic component for signal processing and a main connector for feeding and signal transmission are mounted is provided in the manifold base, and
a second signal relay connector which can be connected to the first signal relay connector and a second feeding connector which can be connected to the first feeding connector are respectively and electrically connected to the main wiring substrate and are separately provided at different positions.

9. A manifold valve according to claim 1,
wherein the solenoid valve is mounted onto the manifold base through an intermediate block,
the solenoid valve has a first feeding connector to be brought into continuity with the pilot valve(s),
the intermediate block includes a plurality of connecting holes for respectively connecting the valve ports in the solenoid valve and base ports in the manifold base, a wiring hole which crosses the connecting holes without communicating with the connecting holes to communicate with the wiring path in the wiring block and through which the signal conductor from the pressure sensor(s) is inserted, a main wiring substrate mounted with an electronic component for signal processing, a second feeding connector which can be connected to the first feeding connector, and a first relay connector for electrically connecting the intermediate block to the manifold base, the signal conductor, the second feeding connector, and the first relay connector are respectively and electrically connected to the main wiring substrate,
the manifold base includes a second relay connector which can be connected to the first relay connector and a main connector for electrically connecting the adjacent manifold bases, and the main connector and the second relay connector are electrically connected to each other.

10. A manifold valve according to claim 2,
wherein the solenoid valve is mounted onto the manifold base through an intermediate block,
the solenoid valve has a first feeding connector to be brought into continuity with the pilot valve(s),
the intermediate block includes a plurality of connecting holes for respectively connecting the valve ports in the solenoid valve and base ports in the manifold base, a wiring hole which crosses the connecting holes without communicating with the connecting holes to communicate with the wiring path in the wiring block and through which the signal conductor from the pressure sensor(s) is inserted, a main wiring substrate mounted with an electronic component for signal processing, a second feeding connector which can be connected to the first feeding connector, and a first relay connector for electrically connecting the intermediate block to the manifold base, the signal conductor, the second feeding connector, and the first relay connector are respectively and electrically connected to the main wiring substrate,
the manifold base includes a second relay connector which can be connected to the first relay connector and a main connector for electrically connecting the adjacent manifold bases, and the main connector and the second relay connector are electrically connected to each other.

11. A manifold valve according to claim 3,
wherein the solenoid valve is mounted onto the manifold base through an intermediate block, the solenoid valve has a first feeding connector to be brought into continuity with the pilot valve(s), the intermediate block includes a plurality of connecting holes for respectively connecting the valve ports in the solenoid valve and base ports in the manifold base, a wiring hole which crosses the connecting holes without communicating with the connecting holes to communicate with the wiring path in the wiring block and through which the signal conductor from the pressure sensor(s) is inserted, a main wiring substrate mounted with an electronic component for signal processing, a second feeding connector which can be connected to the first feeding connector, and a first relay connector for electrically connecting the intermediate block to the manifold base, the signal conductor, the second feeding connector, and the first relay connector are respectively and electrically connected to the main wiring substrate, the manifold base includes a second relay connector which can be connected to the first relay connector and a main connector for electrically connecting the adjacent manifold bases, and the main connector and the second relay connector are electrically connected to each other.

12. A manifold valve according to claim 4, wherein the solenoid valve is mounted onto the manifold base through an intermediate block, the solenoid valve has a first feeding connector to be brought into continuity with the pilot valve(s), the intermediate block includes a plurality of connecting holes for respectively connecting the valve ports in the solenoid valve and base ports in the manifold base, a wiring hole which crosses the connecting holes without communicating with the connecting holes to communicate with the wiring path in the wiring block and through which the signal conductor from the pressure sensor(s) is inserted, a main wiring substrate mounted with an electronic component for signal processing, a second feeding connector which can be connected to the first feeding connector, and a first relay connector for electrically connecting the intermediate block to the manifold base, the signal conductor, the second feeding connector, and the first relay connector are respectively and electrically connected to the main wiring substrate, the manifold base includes a second relay connector which can be connected to the first relay connector and a main connector for electrically connecting the adjacent manifold bases, and the main connector and the second relay connector are electrically connected to each other.

* * * * *